(12) United States Patent
Elsperger et al.

(10) Patent No.: US 11,787,641 B2
(45) Date of Patent: Oct. 17, 2023

(54) METHOD AND DEVICE FOR DISTRIBUTING AND/OR GROUPING CONTAINERS

(71) Applicant: KRONES AG, Neutraubling (DE)

(72) Inventors: Stefan Elsperger, Soechtenau (DE); Michael Hartl, Raubling (DE)

(73) Assignee: KRONES AG, Neutraubling (DE)

( * ) Notice: Subject to any disclaimer, the term of this patent is extended or adjusted under 35 U.S.C. 154(b) by 7 days.

(21) Appl. No.: 17/616,243

(22) PCT Filed: May 25, 2020

(86) PCT No.: PCT/EP2020/064423
§ 371 (c)(1),
(2) Date: Dec. 3, 2021

(87) PCT Pub. No.: WO2020/244951
PCT Pub. Date: Dec. 10, 2020

(65) Prior Publication Data
US 2022/0250855 A1 Aug. 11, 2022

(30) Foreign Application Priority Data
Jun. 5, 2019 (DE) .......................... 102019115198.8

(51) Int. Cl.
*B65G 47/08* (2006.01)
*B65G 47/71* (2006.01)
*B65G 54/02* (2006.01)

(52) U.S. Cl.
CPC ......... *B65G 47/088* (2013.01); *B65G 47/082* (2013.01); *B65G 47/715* (2013.01); *B65G 54/02* (2013.01); *B65G 2201/0244* (2013.01)

(58) Field of Classification Search
CPC .... B65G 47/088; B65G 47/715; B65G 54/02; B65G 2201/0244; B65G 47/082; B65G 47/084
(Continued)

(56) References Cited

U.S. PATENT DOCUMENTS

| 3,481,107 A | 12/1969 | Andblad et al. |
| 5,667,055 A | 9/1997 | Gambetti |

(Continued)

FOREIGN PATENT DOCUMENTS

| CN | 103534182 A | 1/2014 |
| CN | 105015837 A | 11/2015 |

(Continued)

OTHER PUBLICATIONS

English abstract for DE 102011076864 A1 (2012).
(Continued)

*Primary Examiner* — James R Bidwell
(74) *Attorney, Agent, or Firm* — Caesar Rivise, PC (57) ABSTRACT

An apparatus (10) and method for distributing and/or grouping containers in a container treatment system. The device (10) includes a supply conveyor (12), a discharge conveyor (16) and a transfer conveyor (14). The transfer conveyor (14) uses a guide path (28) and several movement devices (30) that can be driven individually, preferably by a long stator linear motor (32) and which are guided along the guide path (28). The several movement devices (30) include a conveyor device (34) that is designed to transfer several containers from the supply conveyor (12) to the discharge conveyor (16). The device (10) can preferably be used to reduce the risk of the containers tipping over when being transferred, to reduce the number of movement devices (30) and/or to enable the containers to be pre-grouped.

18 Claims, 5 Drawing Sheets

(58) Field of Classification Search
USPC .......................................................... 198/430
See application file for complete search history.

(56) References Cited

U.S. PATENT DOCUMENTS

| | | |
|---|---|---|
| 5,799,770 A | 9/1998 | Radewagen |
| 6,112,880 A | 9/2000 | Flix |
| 7,543,424 B2 | 6/2009 | Lechner et al. |
| 8,113,335 B2 | 2/2012 | Aronsson et al. |
| 8,322,514 B2 | 12/2012 | Bonnain et al. |
| 8,776,985 B2 | 7/2014 | Huettner et al. |
| 9,051,132 B2 | 6/2015 | Van De Loecht et al. |
| 9,061,838 B2 | 6/2015 | Van De Loecht et al. |
| 9,682,829 B2 | 6/2017 | Keil et al. |
| 9,850,012 B2 * | 12/2017 | Blanz ..................... B65H 33/16 |
| 9,950,875 B2 | 4/2018 | Walter et al. |
| 10,532,892 B2 | 1/2020 | Knobloch |
| 10,766,650 B2 * | 9/2020 | Choplin .................. B65G 47/32 |
| 10,899,557 B2 | 1/2021 | Cirette et al. |
| 11,084,663 B2 | 8/2021 | Doerenberg |
| 11,136,199 B2 | 10/2021 | Choplin |
| 2002/0008002 A1 | 1/2002 | De Gugliemo et al. |
| 2004/0112714 A1 * | 6/2004 | Davaillon ............ B65G 47/082 |
| | | 198/470.1 |
| 2009/0266677 A1 | 10/2009 | Oppici |
| 2012/0118701 A1 | 5/2012 | Duchemin et al. |
| 2015/0321857 A1 * | 11/2015 | Sacchetti ............. B65G 47/845 |
| | | 198/419.2 |
| 2016/0362208 A1 * | 12/2016 | Papsdorf ................. B65G 47/53 |
| 2022/0204285 A1 * | 6/2022 | Ford ....................... B65G 47/82 |

FOREIGN PATENT DOCUMENTS

| | | | | |
|---|---|---|---|---|
| CN | 113260585 | * | 8/2021 | ............ B65G 47/82 |
| DE | 2408158 A1 | | 8/1975 | |
| DE | 2555674 A1 | | 6/1977 | |
| DE | 4207725 A1 | | 9/1993 | |
| DE | 4439154 A1 | | 5/1996 | |
| DE | 19623872 A1 | | 12/1997 | |
| DE | 102005026639 A1 | | 12/2006 | |
| DE | 60031082 T2 | | 4/2007 | |
| DE | 102011076864 A1 | | 12/2012 | |
| DE | 102011081705 A1 | | 2/2013 | |
| DE | 102011085724 A1 | | 5/2013 | |
| DE | 102013107565 A1 | | 1/2015 | |
| DE | 102015203042 A1 | | 8/2016 | |
| DE | 102017102913 A1 | | 8/2018 | |
| EP | 0027876 A1 | | 5/1981 | |
| EP | 1493693 A2 | | 1/2005 | |
| EP | 1717170 B1 | | 5/2008 | |
| EP | 2511203 A1 | | 10/2012 | |
| EP | 2792626 A1 | | 10/2014 | |
| EP | 2704967 B1 | | 5/2016 | |
| ES | 2099000 T3 | | 5/1997 | |
| ES | 2307252 T3 | | 11/2008 | |
| ES | 2328954 T3 | | 11/2009 | |
| FR | 2759671 A1 | | 8/1998 | |
| FR | 2750122 A1 | | 1/2005 | |
| FR | 3063984 A1 | | 9/2018 | |
| JP | H11147503 A | | 6/1999 | |
| JP | H11263318 A | | 9/1999 | |
| JP | 2008013215 A | | 1/2008 | |
| WO | 2017153401 A1 | | 9/2017 | |
| WO | 2018073529 A1 | | 4/2018 | |
| WO | 2019/228863 | * | 12/2019 | ............ B65G 54/02 |

OTHER PUBLICATIONS

English abstract for DE 102011081705 A1 (2013).
English abstract for DE 102011085724 A1 (2013).
Sennan Search Report from corresponding DE 102019115198.8 dated May 28, 2020.
International Search Report from corresponding PCT/EP2020/064423 dated Sep. 11, 2020.

* cited by examiner

METHOD AND DEVICE FOR DISTRIBUTING AND/OR GROUPING CONTAINERS

CROSS-REFERENCE TO RELATED APPLICATIONS

This application is a U.S. National Phase Application which claims the benefit under 35 U.S.C. 071 of PCT/EP2020/064423, filed May 25, 2020 which claims priority to German application no. DE 10 2019 115 198.8, filed Jun. 5, 2019, the contents of which applications are incorporated by reference herein in their entireties for all purposes.

Technical Field

The invention relates to a device and to a method for distributing and/or grouping containers in a container treatment system.

Technical Background

In container treatment systems, for example in the beverage industry, the containers to be treated are frequently redistributed or regrouped, in order to produce, for example, a plurality of container streams or bundles of containers which can be processed in parallel.

DE 10 2015 203 042 A1 discloses a device for distributing and grouping containers in a container treatment system. The device has an entry conveying apparatus with a single-track entry stream, an exit conveying apparatus with a multiple-track exit stream, and a transfer conveying apparatus. The transfer conveying apparatus is configured to divide the containers from the single-track entry stream into the multiple-track exit stream in an individual and upright manner by way of targeted guiding by circulating guide elements.

WO 2018/073529 A1 discloses a device for transferring products, which device comprises an output apparatus for outputting of the products, which output apparatus moves the products one after another in an output direction, and an exit conveying belt which extends from the output apparatus transversely with respect to the output direction. Furthermore, the device comprises a rotating tool which rotates about a rotational axis parallel to the conveying direction. The tool has collectors which are distributed radially about the axis and can be displaced jointly parallel to the conveying direction. The rotation of the tool brings it about that each following collector releases a group of products from the conveying apparatus onto the exit belt.

A disadvantage of the known prior art can be, for example, a performance limitation as a result of the risk of containers falling over or container damage in the case of the impact of the collectors on the containers. The transferring generates a gap between each container row. Multiple-row bundles require a grouping device which is of correspondingly long dimensions and is arranged downstream. In addition, the rigid spacing of the collectors considerably restricts the flexibility in the case of the transferring of the plurality of containers.

The invention is based on the object of providing an alternative and/or improved technique for distributing and/or grouping containers.

SUMMARY OF THE INVENTION

The object is achieved by way of the features of the independent claims. Advantageous developments are specified in the dependent claims and the description.

The invention provides a device for distributing and/or grouping containers in a container treatment system (for example, for producing, cleaning, checking, filling, closing, labeling, printing and/or packaging of containers for liquid media, preferably beverages or liquid foodstuffs). The device has an entry conveying apparatus which is configured to convey a multiplicity of containers in a single-track container entry stream (for example, by a conveyor belt). The device has an exit conveying apparatus which is configured to discharge the containers in a multiple-track container exit stream (for example, by an expediently single conveyor belt and/or in an angular manner, particularly preferably transversely (for example, 90°) with respect to the container entry stream or the entry conveying apparatus). The device has a transfer conveying apparatus which has a guide track (which circulates and/or is oriented, for example, parallel to the container exit stream/the exit conveying apparatus) and a plurality of movement devices which can be driven individually (for example, separately and independently of one another), preferably by a long stator linear motor. The plurality of movement devices are guided along the guide track. The plurality of movement devices have (for example, in each case or at least partially) one conveying element (which can be retracted and extended, for example) which is configured to transfer in each case a plurality of containers from the entry conveying apparatus to the exit conveying apparatus (preferably while the plurality of movement devices move along the guide track).

The device can make it possible to achieve a multiplicity of advantages by way of the individual movement capability of the movement devices. For example, the device can bring about a considerably reduced elastic jolt by retardation of the respective movement device, which jolt is exerted by the conveying element on the containers during the contacting of the plurality of containers. In particular in the case of containers which are at risk of tipping, this can make a substantially higher throughput performance and/or gentler container handling possible. The movement devices can also be moved for supporting the plurality of containers on the front side, as a result of which a risk of tipping during the transferring can likewise be reduced. The movement devices can also be moved in order to achieve a (pre-) grouping function, with the result that a grouping device which is arranged downstream can be of more compact configuration or can even be completely omitted. In the case of the use of a long stator linear motor for driving the movement devices, the latter can stop in a substantially more sensitive and dynamic manner, for example in the case of overloading, as a result of the drive which does not have a transmission, is decentral and therefore has a lower mass moment of inertia. In this way, lower mechanical loading of the movement devices and the guide track can be achieved. This can be relevant, in particular, when the transfer conveying apparatus is constructed in a cantilever design. It is also possible for a number of movement devices to be kept as low as possible, since the movement devices can be moved, for example, with a great spacing and a great speed in a return section of the guide track.

The containers can expediently be cans, glass bottles or other glass vessels which, for example, can be closed by way of a lid, plastic bottles, for example made from PET, shaped containers, such as, for example, rectangular PET containers, containers made from cardboard, or the like. In particular, containers of different sizes, cross sections and/or different weight can be distributed and/or grouped by way of the device and the method in accordance with the present disclosure.

It is possible that a shape and/or an alignment of the guide track are/is arbitrary, as long as a section of the guide track (working section) is arranged in the region of a transition between the entry conveying apparatus and the exit conveying apparatus in such a way that in each case a plurality of containers can be transferred from the container entry stream by the guide elements and can be distributed to the exit conveying apparatus. The guide track can preferably be substantially closed, substantially closed meaning that the respective guide track has at least one closed path for circulation for the plurality of movement devices. This can be realized, for example, by way of provision of a return section as part of the guide track. In the return section, a return of the movement devices to the entry conveying apparatus after transfer of the containers to the exit conveying apparatus can be made possible. In addition to a main section, one or more auxiliary sections can be provided which are connected to the main section, for example, via diverters. In the case of a long stator linear drive, it does not have to extend along the entire guide track. As an alternative, for example, the return section can be configured with a continuous drive, such as a transport belt or the like.

In one exemplary embodiment, the conveying elements are configured in each case to push a plurality of containers on the rear side and/or to support them on the front side during the transfer.

In a further exemplary embodiment, it is possible for the conveying elements to be retracted and extended parallel to the container entry stream for container retardation in an entry conveying direction of the entry conveying apparatus, preferably at least partially by a slotted guide (for example, extending) and/or by a drive unit (for example, in order to retract and retard the container during the entry or input). The plurality of containers can therefore be contacted in the moving container entry stream by the conveying element which is retracted at a speed which is adapted to a conveying speed of the container entry stream, and preferably corresponds to said conveying speed. During the transfer, the conveying element is then retracted further and retarded in the process, in order to decrease the speed component parallel to the container entry stream, for example to zero or approximately zero.

In a further exemplary embodiment, the conveying elements are configured as divider bars, preferably with a plurality of projections which are arranged at a predefined or adjustable spacing from one another. During the transfer, the containers can be held securely and also supported laterally between the projections. An adjustment capability of the projections with respect to one another can make a format change possible, for example to larger or smaller containers. If the external dimensions of the containers do not change substantially during the format change, it is also possible that the spacing between the projections or extensions does not have to be changed.

In one embodiment, furthermore, the device has a control unit which is set up for the operation (for example, open loop control and/or closed loop control) of the entry conveying apparatus, the transfer conveying apparatus, the exit conveying apparatus, the plurality of movement devices and/or the long stator linear motor.

The term "control unit" can preferably relate to an electronic component which, depending on the configuration, can assume open loop control tasks and/or closed loop control tasks. Even if the term "open loop control" is used herein, "closed loop control" or "control with feedback" can expediently also as it were be included in this.

In one development, the control unit is set up to move the plurality of movement devices along the guide track in such a way that the plurality of movement devices are retarded (/braked) (for example, in each case or at least partially) directly before the (for example, front-side or rear-side) contacting of the plurality of containers by the conveying element, preferably in order to reduce a jolt in the case of the contacting of the plurality of containers and/or for the at least approximately jolt-free contacting of the plurality of containers. In this way, a risk of containers tipping during the transfer can be decreased, and a gentle and reliable container transfer can be ensured.

In a further embodiment, the plurality of movement devices are accelerated (for example, in each case or at least partially) (that is to say, their speed is increased) in the case of the transfer of the plurality of containers, preferably to a conveying speed of the exit conveying apparatus. In this way, a container throughput can be increased.

In one design variant, the control unit is set up to move the plurality of movement devices along the guide track in such a way that the conveying elements of two movement devices, which preferably follow one another, of the plurality of movement devices push the plurality of containers on the rear side and support them on the front side during the transfer. In this way, a risk of containers tipping during the transfer can be decreased, and/or a higher transfer speed can be made possible in order to increase the container throughput.

In a further design variant, the control unit is set up to move the plurality of movement devices along the guide track in such a way that the conveying elements of two movement devices, which preferably follow one another, of the plurality of movement devices clamp the plurality of containers between them during the transfer. In this way, a risk of containers tipping during the transfer can likewise be decreased, and/or a higher transfer speed can be made possible in order to increase the container throughput.

In one exemplary embodiment, the control unit is set up to move the plurality of movement devices along the guide track in such a way that a leading movement device of the plurality of movement devices is moved back along the guide track, after the transfer of the plurality of containers by pushing on the rear side by way of the conveying element of the leading movement device, until the conveying element of the leading movement device makes contact on the front side with a plurality of following containers. During the transfer of the plurality of following containers, the conveying element of the leading movement device supports the plurality of following containers on the front side, and the conveying element of a trailing movement device of the plurality of movement devices pushes the plurality of following containers on the rear side. Each movement device can therefore participate in two transfer operations which follow one another. First of all, its conveying element is used for rear-side pushing, inter alia, in a direction parallel to the container exit stream. The movement device is then moved back counter to the container exit stream, in order to support the next plurality of containers on the front side during the next transfer operation. The simultaneous front-side support and the rear-side pushing can, as has already been mentioned, decrease a risk of containers tipping during the transfer, and/or can make a higher transfer speed possible in order to increase the container throughput.

In a further exemplary embodiment, the control unit is set up to move the plurality of movement devices along the guide track in such a way that at least two (for example, two, three, four, etc.) movement devices, which follow one another, of the plurality of movement devices are moved along the guide track relative to one another in such a way that the conveying elements of the at least two (for example, two, three, four, etc.) movement devices group (/combine) a plurality of container rows in the multiple-track container exit stream. In this way, the transfer conveying apparatus can already have a grouping functionality, as a result of which a grouping device which is arranged downstream with regard to the container exit stream can be of more compact design or can possibly be omitted completely.

The grouping can expediently take place in a preset pattern and/or can take place by way of a change, particularly preferably a decrease, of a relative spacing between the at least two movement devices and their conveying elements.

In one embodiment, the control unit is set up to move the plurality of movement devices along the guide track in such a way that a spacing (/a relative distance) and/or a speed of the plurality of movement devices are/is increased in a return section of the guide track, in which return section the plurality of movement devices are returned for the renewed transfer of a plurality of containers. As a result, a number of movement devices which are necessary for the transfer can be decreased.

In a further embodiment, the device has a grouping device which is arranged downstream of the transfer conveying apparatus and has a plurality of push bars, preferably driven by chain, belt or linear motor, for grouping the plurality of containers on the exit conveying apparatus. The grouping device can perform final grouping of the containers in the container exit stream.

In a further embodiment, the entry conveying apparatus has at least one dividing device for specifying a preset (for example, predetermined or adjustable) spacing of the containers of the container entry stream. The at least one dividing device can preferably be configured as a dividing worm or can have a plurality of dividing elements which preferably can be driven (moved) individually by a long stator linear motor system. In this way, the containers in the container entry stream can be moved to a desired spacing. The use of a dividing worm can be implemented in a simple manner. The use of dividing elements which can be driven individually can make a flexible setting of the spacing possible, for example in the case of format changes (for example, between containers with different volumes (for example, 0.5 1, 1 1, 1.5 1, etc.) and/or different shapes (for example, round cross section, rectangular cross section, etc.)).

In one exemplary embodiment, the entry conveying apparatus is of single-track configuration. As an alternative, the entry conveying apparatus can be of multiple-track (for example, two-track) configuration (for example, with a plurality of parallel tracks, preferably configured as a plurality of parallel conveyor belts). It is preferably possible for the single-track container entry stream to be switched via the multiple-track entry conveying apparatus. In this way, for example, a respective desired track of the entry conveying apparatus can be selected for the container entry stream to the transfer conveying apparatus. The non-selected tracks do not convey as far as the transfer conveying apparatus. This makes, for example, format changes on the fly possible. It is noted explicitly that the multiple-track entry conveying apparatus is disclosed herein independently of a presence and/or a configuration of the exit conveying apparatus and/or the transfer conveying apparatus.

Each of the plurality of tracks of the entry conveying apparatus can expediently be assigned a dedicated dividing device.

In a further exemplary embodiment, the device has a first entry conveyor, preferably with a container buffer store and/or a section with a stream cross section which tapers in a container stream direction, the first entry conveyor preferably being arranged upstream of the entry conveying apparatus and preferably being connected to a first track of the entry conveying apparatus. In one development, the device can have a second entry conveyor, preferably with a container buffer store and/or a section with a stream cross section which tapers in a container stream direction, the second entry conveyor preferably being arranged upstream of the entry conveying apparatus and preferably being connected to a second track of the entry conveying apparatus. In this way, a high flexibility and a rapid changeover from one container sort to another container sort can advantageously be achieved.

In one development, the device has a container treatment device which is arranged upstream of the first entry conveyor and upstream of the second entry conveyor, and has an exit (which has, for example, two channels) for the selective output of containers to the first entry conveyor or to the second entry conveyor.

As an alternative, the device can have, for example, a first container treatment device which is arranged upstream of the first entry conveyor and has an exit for the output of containers to the first entry conveyor, and a second container treatment device which is arranged upstream of the second entry conveyor and has an exit for the output of containers to the second entry conveyor.

It is possible that the (first) container treatment device and/or the second container treatment device are/is configured to produce, to clean, to check, to fill, to close, to label and/or to print containers.

The invention also relates to a method for distributing and/or grouping containers in a container treatment system (for example, for producing, cleaning, checking, filling, closing, labeling, printing and/or packaging containers for liquid media, preferably beverages or liquid foodstuffs), preferably for operating a device for distributing and/or grouping containers as disclosed herein. The method comprises transferring in each case of a plurality of containers of a single-track container entry stream to a multiple-track container exit stream by a transfer conveying apparatus. The transfer conveying apparatus has a guide track (which circulates and/or is oriented, for example, parallel to the container exit stream) and a plurality of movement devices which can be driven individually (for example, separately and independently of one another), preferably by a long stator linear motor. The plurality of movement devices are guided along the guide track. The plurality of movement devices have (for example, in each case or at least partially) a conveying element which is configured to transfer in each case a plurality of containers from the single-track container entry stream to the multiple-track container exit stream (preferably while the plurality of movement devices move along the guide track). By way of the method, the same advantages as by way of the device disclosed herein for distributing and/or grouping containers can be achieved.

Furthermore, the method can expediently comprise single-track entry conveying of a multiplicity of containers in the container entry stream and/or multiple-track exit conveying of the containers in the multiple-track container exit stream.

In one exemplary embodiment, the transferring comprises retarding (/braking) of the respective movement device during the movement along the guide track directly before contacting (for example, on the front side or on the rear side) of the respective plurality of containers by the conveying element, preferably in order to decrease a jolt during the contacting of the respective plurality of containers and/or for the at least approximately jolt-free contacting of the respective plurality of containers. In this way, a risk of containers tipping during the transfer can be decreased.

In a further exemplary embodiment, the transferring comprises accelerating (/increasing of a speed) of the respective movement device during the movement along the guide track during the transfer of the respective plurality of containers, preferably to a conveying speed of the container exit stream. In this way, container throughput can be increased.

In one embodiment, the transferring comprises rear-side pushing and front-side supporting of the plurality of containers during the transfer by way of the conveying elements of two movement devices, which preferably follow one another, of the plurality of movement devices which move along the guide track. In this way, a risk of containers tipping during the transfer can be decreased, and/or a higher transfer speed can be made possible in order to increase the container throughput.

In a further embodiment, the transferring comprises clamping of the plurality of containers during the transfer by way of the conveying elements of two movement devices, which preferably follow one another, of the plurality of movement devices which move along the guide track. In this way, a risk of containers tipping during the transfer can likewise be decreased, and/or a higher transfer speed can be made possible in order to increase the container throughput.

In one design variant, the transferring comprises, after the conveying element of the leading movement device has transferred the plurality of containers by way of rear-side pushing, moving back of a leading movement device of the plurality of movement devices along the guide track until the conveying element of the leading movement device contacts a plurality of following containers on the front side. Furthermore, the transferring comprises front-side supporting of the plurality of following containers by way of the conveying element of the leading movement device during the movement along the guide track, while the conveying element of a trailing movement device of the plurality of movement devices pushes the plurality of following containers on the rear side during the movement along the guide track. As has already been mentioned, each movement device can participate in two transfer operations which follow one another in this way and, as a result, a risk of containers tipping during the transfer can b e decreased, and/or a higher transfer speed can be made possible in order to increase the container throughput.

In a further design variant, the transferring comprises extending of the conveying element of the respective movement device counter to the container entry stream before contacting of the respective plurality of containers, preferably by a slotted guide and/or a drive unit. Furthermore, the method can comprise container retarding in an entry conveying direction by retracting and braking of the conveying element of the respective movement device in a manner which is opposed with respect to the extending in the case of rear-side pushing of the respective plurality of containers during the moving of the respective movement device along the guide track, preferably by a slotted guide and/or a drive unit. Therefore, the plurality of containers can be contacted in the moving container entry stream by the conveyor element which is retracted at a speed which is adapted to a conveying speed of the container entry stream, and preferably corresponds to said conveying speed. During the transferring, the conveying element is then retracted further and is retarded in the process, in order to decrease the speed component parallel to the container entry stream, for example to zero or approximately zero.

In one exemplary embodiment, furthermore, the method comprises grouping of a plurality of containers in the multiple-track container exit stream by way of the conveying elements of at least two (for example, two, three, four, etc.) movement devices, which preferably follow one another, by way of movement of the at least two movement devices relative to one another along the guide track. As has already been mentioned, a grouping functionality can already be provided in this way by way of the transfer conveying apparatus, as a result of which a grouping device which is arranged downstream with regard to the container exit stream can be of more compact design or can possibly be omitted completely.

In a further exemplary embodiment, the method comprises enlarging of a spacing (/a relative distance) and/or increasing a speed of the respective movement devices in a return section of the guide track for the return of the plurality of movement devices for the renewed transfer of in each case a plurality of containers. As has already been mentioned, a required number of movement devices can be decreased in this way.

In one embodiment, furthermore, the method comprises shifting of a track of the single-track container entry stream, for example, on a multiple-track entry conveying apparatus. This can be carried out, for example, during running operation in order to make a format change on the fly possible.

In a further embodiment, the method comprises changing of a spacing of the single-track container entry stream by (for example, guided and) individually drivable dividing elements of a dividing device. The dividing elements can expediently be capable of being driven individually by a long stator linear motor system. As an alternative, for example, dividing, which is predefined by dividing worm, for example, of the single-track container entry stream can be performed.

In a further embodiment, furthermore, the method comprises changing of a spacing between projections of the conveying elements (for example, configured as dividing bars) in the case of a format change (for example, between containers with different external dimensions).

In a further embodiment, furthermore, the method comprises interruption-free shifting of a container feed to the transfer conveying apparatus from a first entry conveyor to a second entry conveyor, preferably in order to change the container sort. Furthermore, the method can optionally comprise changing over of the first entry conveyor to a new container sort, while the second entry conveyor feeds containers to the transfer conveying apparatus, and/or changing over of the second entry conveyor to a new container sort, while the first entry conveyor feeds containers to the transfer conveying apparatus.

The above-described preferred embodiments and features of the invention can be combined with one another in any desired manner.

BRIEF DESCRIPTION OF THE FIGURES

Further details and advantages of the invention will be described below with reference to the appended drawings, in which.

The embodiments which are shown in the figures coincide at least in part, with the result that similar or identical parts are provided with the same designations and reference is also made for the explanation to the description of the other embodiments or figures, in order to avoid repetitions.

DETAILED DESCRIPTION OF EXEMPLARY EMBODIMENTS

Figure 1:
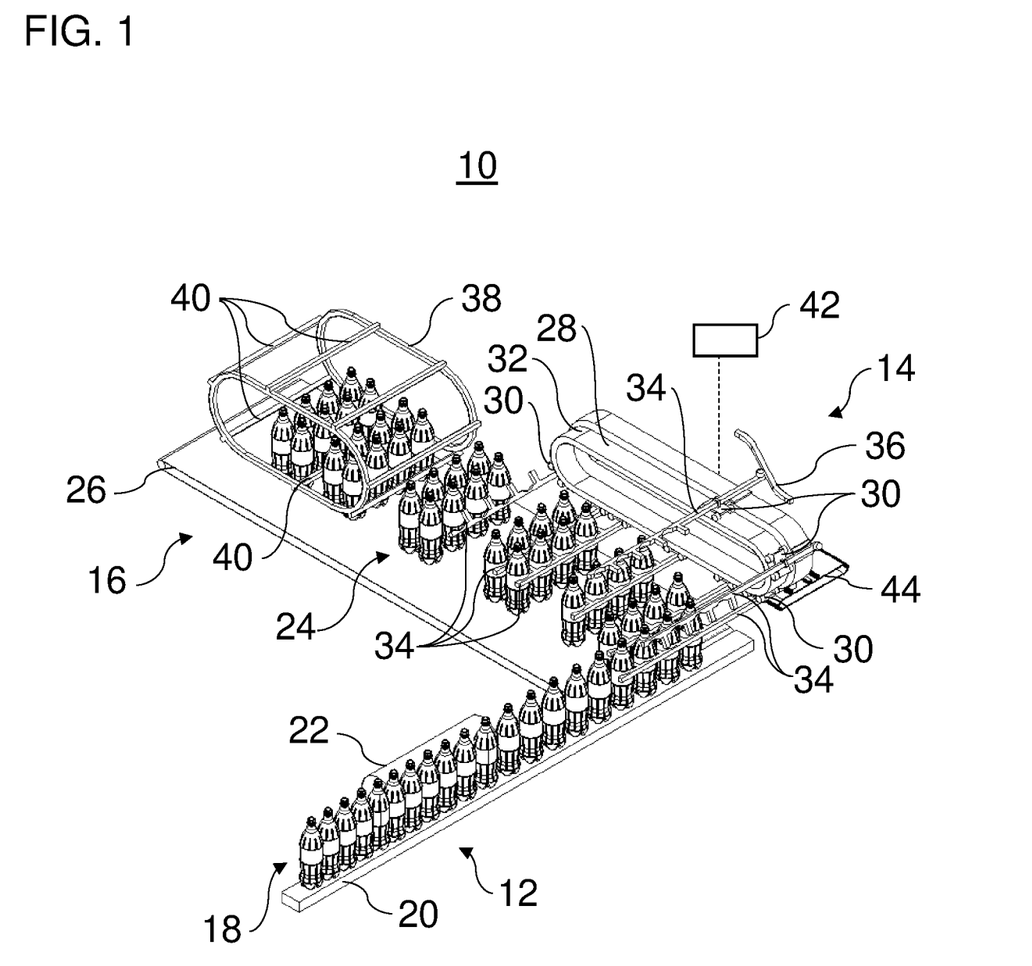
FIG. 1 shows a perspective view of a device for distributing and/or grouping containers in accordance with one exemplary embodiment of the present disclosure.

FIG. 1 shows a device 10 for distributing and/or grouping containers in a container treatment system. The container treatment system can be configured, for example, for producing, cleaning, checking, filling, closing, labeling, printing and/or packaging containers for liquid media, for example beverages or liquid foodstuffs.

The device 10 has a single-track entry conveying apparatus 12, a transfer conveying apparatus 14 and a multiple-track exit conveying apparatus 16.

On the entry conveying apparatus 12, a multiplicity of containers (for example, bottles, cans, beverage cartons, etc.) are conveyed in a single-track container entry stream 18. The container entry stream 18 is conveyed to the transfer conveying apparatus 14. The entry conveying apparatus 12 can have, for example, a circulating conveyor belt 20 for conveying the containers. The containers of the container entry stream 18 can lie on the conveyor belt 20.

The entry conveying apparatus 12 can have a dividing device 22. The container entry stream 18 can be accumulated on the dividing device 22. The dividing device 22 can move the containers of the container entry stream 18 to a predefined spacing/a predefined distance from one another. The predefined spacing of the container entry stream 18 is maintained on the entry conveying apparatus 12 downstream of the dividing device 22. The predefined spacing can be specified, for example, by way of a configuration or geometry of the dividing device 22. For example, the dividing device 22 can be configured as a dividing worm. The dividing worm can have a rotatable body with a worm-shaped or helical outer shell. A pitch of the worm threads or the helix can correspond to the desired predefined spacing of the containers of the container entry stream 18.

It is also possible that the dividing device 22 is of different configuration. For example, the dividing device can also have individually drivable dividing elements which are driven, for example, by a long stator linear motor system. In this way, for example, any desired spacing can be set by the movable dividing elements (movers or carriages). The movable dividing elements can comprise, for example, an expediently movable paddle, in order to space apart the containers from one another to any desired spacing. In this way, dividing of shaped bottles is also possible. This variant is not shown in the drawing. The movable dividing elements can be guided on a preferably circulating or closed guide track (in a similar manner to the movement devices 30).

On the exit conveying apparatus 16, a multiplicity of containers are conveyed in a multiple-track container exit stream 24. The container exit stream 24 is formed by way of the transfer conveying apparatus 14. The exit conveying apparatus 16 can have, for example, a circulating conveyor belt 26 in order to convey the containers. The containers of the container exit stream 24 can lie on the conveyor belt 26.

The transfer conveying apparatus 14 transfers in each case a plurality of containers of the container entry stream 18 from the entry conveying apparatus 12 to the container exit stream 24 on the exit conveying apparatus 16.

The transfer conveying apparatus 14 has a guide track 28 and a plurality of movement devices 30.

The guide track 28 is configured as a closed, circulating guide track. The guide track 28 is oriented parallel to the exit conveying apparatus 16. The movement devices 30 are guided on the guide track 28. For example, the movement devices 30 can be guided on the guide track 28 in each case by one or more guide elements. The guide elements can be configured, for example, as rotatable rollers or sliding pads. The guide track can have, for example, one or more guide rails, guide grooves and/or moving tracks which run in parallel.

The movement devices 30 can be driven individually. The movement devices 30 can therefore be moved separately and independently of one another. Since the movement devices 30 are all guided on the guide track 28, their movements are to be adapted to one another.

The transfer conveying apparatus 14 can particularly preferably have a long stator linear motor 32 with the movement devices 30. Permanent magnets and/or electromagnets of the long stator segments of the long stator linear motor 32 can enter into magnetic interaction with permanent magnets and/or electromagnets of the movement devices 30 for individual driving of the movement devices 30. It is also possible, however, that the movement devices 30 can be driven individually by another technology. For example, the movement devices 30 can in each case have a dedicated drive unit which is, for example, electric for driving the respective guide elements.

In comparison with other individual drives, the use of the long stator linear motor 32 can have the advantage that, as a result of the drive of the movement devices 30 which does not have a transmission, is decentral and therefore has a lower mass moment of inertia, said movement devices 30 can be stopped in a substantially more sensitive and dynamic manner, for example, in the case of overloading. In this way, lower mechanical loading of the movement devices 30 and the guide track 28 can be achieved. This can be important, in particular, in the case of the cantilever design which is shown of the transfer conveying apparatus 14.

The movement devices 30 in each case have a conveying element 34. The conveying element 34 in each case transfers a plurality of containers of the container entry stream 18 to the container exit stream 24. The conveying element 34 is arranged in such a way that it projects over the entry conveying apparatus 12 and the exit conveying apparatus 16. The conveying element 34 can be used for pushing in each case a plurality of containers on the rear side and for supporting in each case a plurality of containers on the front side. For example, the conveying element 34 can be configured as a dividing bar. On its front side, for example, the dividing bar can have a plurality of extensions or projections for secure holding of the containers during the transfer. For example, the projections can be positioned between adjacent containers during the transfer, in order to hold the containers securely on the dividing bar. A rear side of the dividing bar can have, for example, a planar supporting face.

It is possible that the conveying elements 34 can be retracted and extended in each case individually. The conveying elements 34 can be retracted and extended parallel to the container entry stream 18/the entry conveying apparatus 12.

For example, the conveying elements 34 can be mounted displaceably. In each case before the contacting of a plurality of containers, the conveying elements 34 can be extended by way of an (extending) slotted guide 36. For example, the conveying element 34 can have an actuating element which, in order to extend the conveying element 34, is guided along the slotted guide 36, for example in a return section of the guide track 28.

The conveying elements 34 can be retracted as desired during the transfer of the plurality of containers from a drive unit 44. During retraction, the plurality of containers can be retarded with regard to the advancing direction of the entry conveying apparatus 12. As is shown, the drive unit 44 can be arranged externally from the movement devices 30. The drive unit 44 can be configured, for example, in the form of a circulating (flat) belt, on which at least one contact element for contacting the actuating elements of the conveying elements 34 is arranged. It is possible that the movement devices 30 in each case have dedicated drive units, preferably linear drive units, for retracting and/or extending the conveying elements 34. It is also possible for the conveying elements 34 to be retracted by a (retracting) slotted guide during the transfer of the plurality of containers.

Furthermore, the device 10 can optionally have a grouping device 38. The grouping device 38 can be arranged downstream of the transfer conveying apparatus 14 with regard to the container exit stream 24. The grouping device 38 has, for example, a plurality of push bars 40 for (final) grouping of the container exit stream 24. The push bars 40 are guided and driven in a circulating manner. For example, the push bars 40 can be driven by a chain, belt or long stator linear motor. The push bars 40 can be moved in such a way that they in each case back up, push together and/or push apart container rows for (final) grouping. In the case of (final) grouping, an exact, predefined grouping can be performed with regard to number, formation and position of the containers of the container exit stream 24. This can be necessary, for example, in order to automatically package the grouped containers of the container exit stream 24 in a downstream packaging machine (not shown).

Furthermore, the device 10 has a control unit 42 (shown only diagrammatically in FIG. 1) for open loop controlling and/or closed loop controlling (controlling with feedback) of the transfer device 14. The control unit 42 can expediently control the individual movement of the movement devices 30 and optionally the individual retraction and/or extension of the conveying elements 34, as is described in detail in the following text on the basis of different examples. Furthermore, the control unit 42 can be set up to operate the entry conveying apparatus 12, the exit conveying apparatus 16 and/or the grouping device 38.

The possibility of individual driving of the movement devices 30 result in new degrees of freedom for the improved transfer of the plurality of containers by way of the transfer conveying apparatus 14, which new degrees of freedom can be utilized, for example, individually or in combination with one another.

Figure 2:
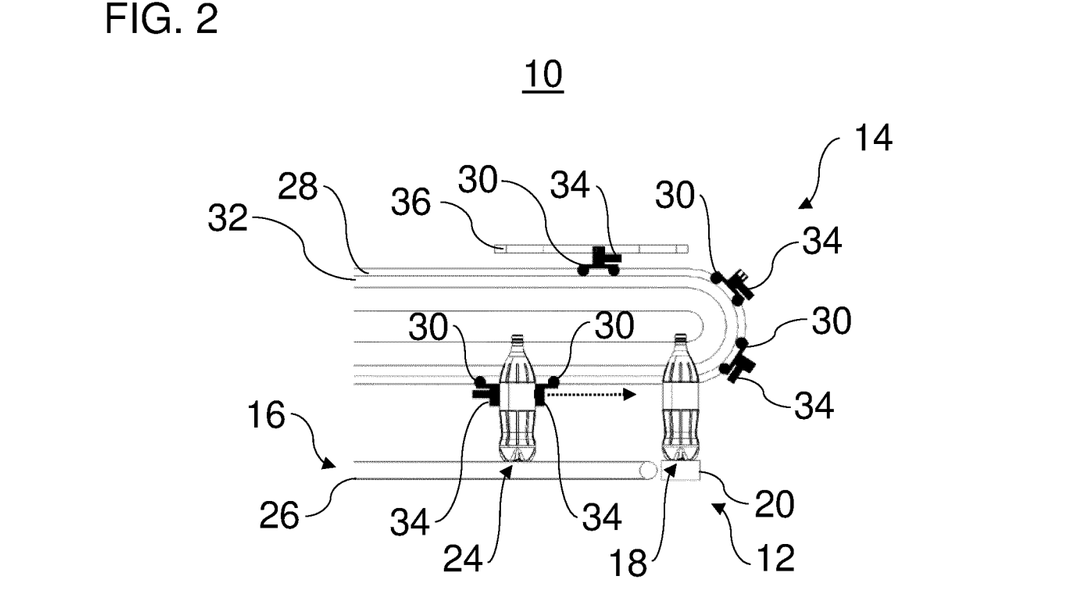
FIG. 2 shows a diagrammatic side view of a detail from the exemplary device.
Figure 3:
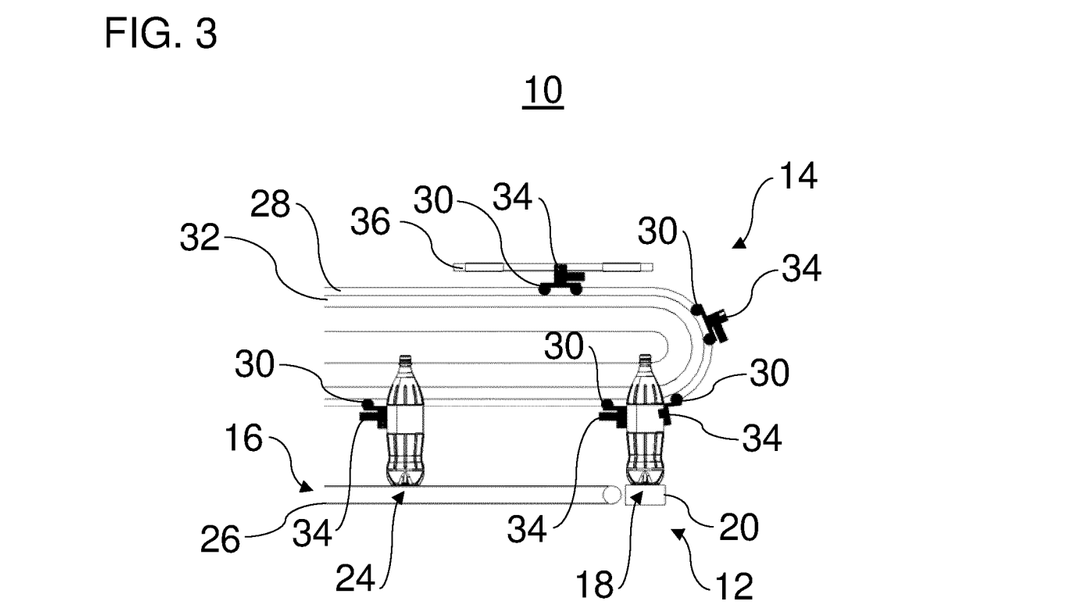
FIG. 3 shows a diagrammatic side view of the detail from the exemplary device at a later time.

FIGS. 2 and 3 show an exemplary movement sequence of the movement devices 30. For example, the movement devices 30 can be moved in each case in pairs in such a way that the conveying elements 34 of the pair of the movement devices 30 clamp the respectively transferred containers between them during the transfer. The conveying element 34 of the leading movement device 30 can support the containers on the front side. The conveying element 34 of the trailing movement device 30 can push the containers on the rear side. As a result, in particular, a risk of tipping of containers at risk of tipping during the transfer can be decreased considerably. A speed during the transfer can likewise be increased by way of the secure holding of the containers.

The movement devices 30 can be moved here, for example, as follows: first of all, the movement device 30 is moved along the guide track 28 in a direction of the container exit stream 24. The respective conveying element 34 comes into contact on the rear side with a plurality of containers of the container entry stream 18. As a result of the movement of the respective movement device 30 along the guide track 28, the respective conveying element 34 pushes the plurality of containers onto the exit conveying apparatus 16. Afterward, the respective movement device 30 can be moved back, that is to say counter to the direction of the container exit stream (see dashed arrow in FIG. 2). The respective movement device 30 is moved back until its conveying elements 34 contact a plurality of trailing containers on the front side for support on the front side. During the front-side supporting, the respective movement device 30 moves in the direction of the container exit stream 24 again. During this, the plurality of trailing containers are pushed on the rear side by way of the conveying element 34 of the trailing movement device 30 from the entry conveying apparatus 12 to the exit conveying apparatus 16.

The individual driving capability of the movement devices 30 can also be utilized to retard/brake the movement devices 30 directly before the contacting of the plurality of containers of the container entry stream 18. The respective conveying element 34 of the movement devices 30 comes into contact with the plurality of containers with a speed which is merely low. As a result, undesired jolting of the plurality of containers during contacting by way of the respective conveying element 34 can be prevented and/or can be at least substantially reduced. As a result, the risk of the containers falling over during contacting can be decreased.

It is possible for the movement devices 30 to be accelerated, after the respective conveying elements 34 have touched the respective plurality of containers of the container entry stream 18. The movement devices 30 can be accelerated in such a way that a higher speed level which is desired in order to achieve the respective desired conveying capacity is reached. The speed level can be adapted to a front speed of the exit conveying apparatus 16.

It is also possible to move the movement devices 30 after the transfer of the plurality of containers onto the exit conveying apparatus 16 in order to (pre-) group the containers of the container exit stream 24. For example, relative spacings between rows, which follow one another, of containers of the container exit stream 24 can be adapted by way of the conveying elements 34. During the movement along the guide track 28, the movement devices 30 of the respective conveying elements 34 can be braked, accelerated, moved forward and/or moved backward individually as desired to this end. The (pre-) grouping can have the advantage that the grouping device 38 can be omitted or can at least be made considerably smaller, in particular shorter.

A further possibility for the advantageous utilization of the individual driving capability of the movement devices 30 consists in that the movement devices 30 can be moved with a greater spacing and a higher speed during the movement along a return section of the guide track 28. In the return section of the guide track 28, the movement devices 30 are returned for the renewed transfer of a plurality of containers of the container entry stream 18. As a result, a number of movement devices 30 which are required for the operation of the transfer conveying apparatus 14 can be decreased considerably.

Figure 4:
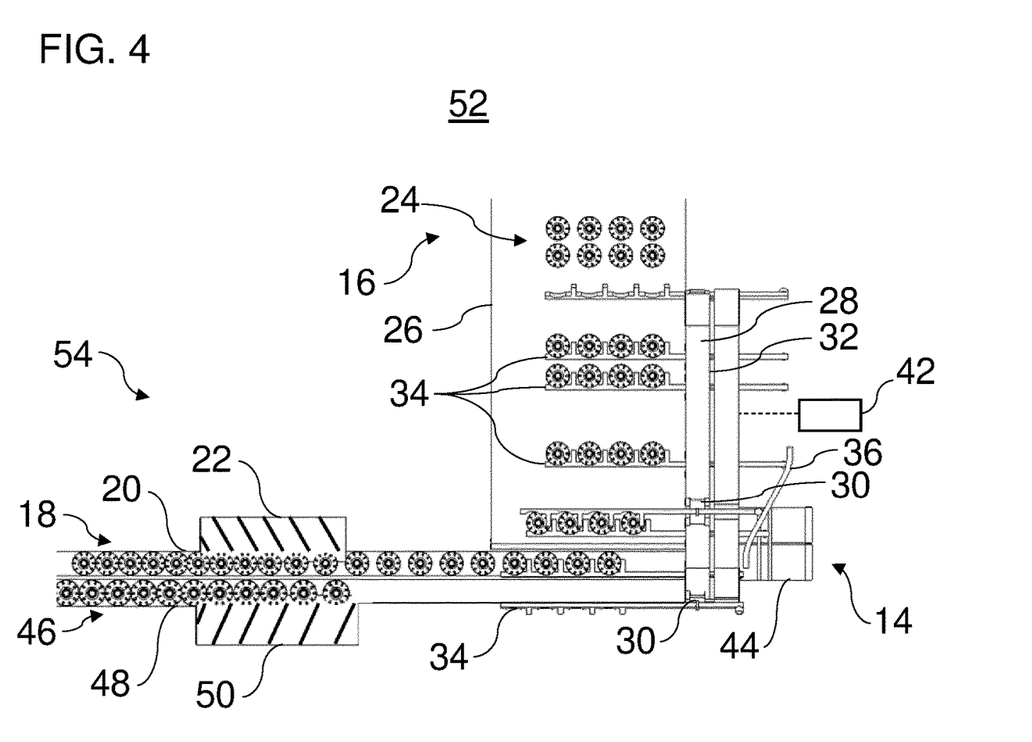
FIG. 4 shows a top view of one exemplary device for distributing and/or grouping containers in accordance with one exemplary embodiment of the present disclosure.

FIG. 4 shows a further device 52 for distributing and/or grouping containers in a container treatment system in a similar manner to FIG. 1.

The device 52 differs from the device 10 in terms of the entry situation. The entry conveying apparatus 54 has multiple tracks. In detail, the entry conveying apparatus 54 can have, for example, two container entry streams 18, 46 with in each case a multiplicity of containers. It is also possible for more than two expediently parallel tracks to be provided. The container entry streams 18, 46 are conveyed to the transfer conveying apparatus 14. The entry conveying apparatus 54 can have, for example, two circulating conveyor belts 20, 48 for conveying the containers.

In addition, the entry conveying apparatus 54 can have, for example, two dividing devices 22 and 50. The first dividing device 22 specifies a spacing for the first container entry stream. The second dividing device specifies a spacing for the second container entry stream. The dividing devices 22, 50 can specify different or identical spacings, depending on the configuration or setting. The dividing devices 22, 50 can be configured, for example, as dividing worms or as dividing elements which can be driven individually, for example, by a long stator linear motor system.

In the device 52, it is possible by way of the entry conveying apparatus 54 to carry out a format changeover to another container format, to be precise during operation or production. To this end, in the first container entry stream 18 on the conveyor belt 20, a container format is processed by the device 52 in accordance with the description of the device 10. If the format is then changed over to another container in the container treatment system, the system upstream of the device 52 can already be changed over to the new container format. While the device 52 is still processing the old container format, the new container format can already be approaching on the second container entry stream 46 (as shown in FIG. 2). As soon as the first container stream 18 is used up, the second container stream 46 can then finally be conveyed to the transfer conveying apparatus 14. Expediently, only one of the container streams 18, 46 is always conveyed to the conveying apparatus. The other waits with final feeding to the transfer conveying apparatus 18 until the desired time of the format changeover which at the same time brings about the stop of the previously conveyed container entry stream 18 or 46. In this way, a format change "on the fly" is possible here.

In detail, for example, required manual format changing work can already take place in this way during the production and therefore without a loss of time. The actual program changeover takes place using control technology. Here, the conveyor belt 20 and the dividing device 22 stop, while at the same time the conveyor belt 48 and the dividing device 50 start up. FIG. 4 shows the conveyor belt 20 in operation. The container entry stream 18 is fed to the transfer conveying apparatus 14. During this, the conveyor belt 48 and therefore the container entry stream 46 are already being prepared for the format change on the fly.

The control unit 42 can consider, for example, a changed contact position of the conveying elements 34 with the containers on the conveyor belt 48. For example, the control unit can adapt a movement profile of the conveying elements 34 in such a way that the containers are pushed gently over to the conveyor belt 20 in a manner which corresponds to the respective active container entry stream 18 or 46. The conveying elements 34 can displace the containers of the first container entry stream 18 from the conveyor belt 20 directly to the conveyor belt 26 of the exit conveying apparatus 16. The conveying elements 34 can displace the containers of the second container entry stream 46 via the conveyor belt 20 to the conveyor belt 26. As has already been explained, more than two entry conveyor belts which are arranged next to one another in parallel are also conceivable.

Figure 5A:
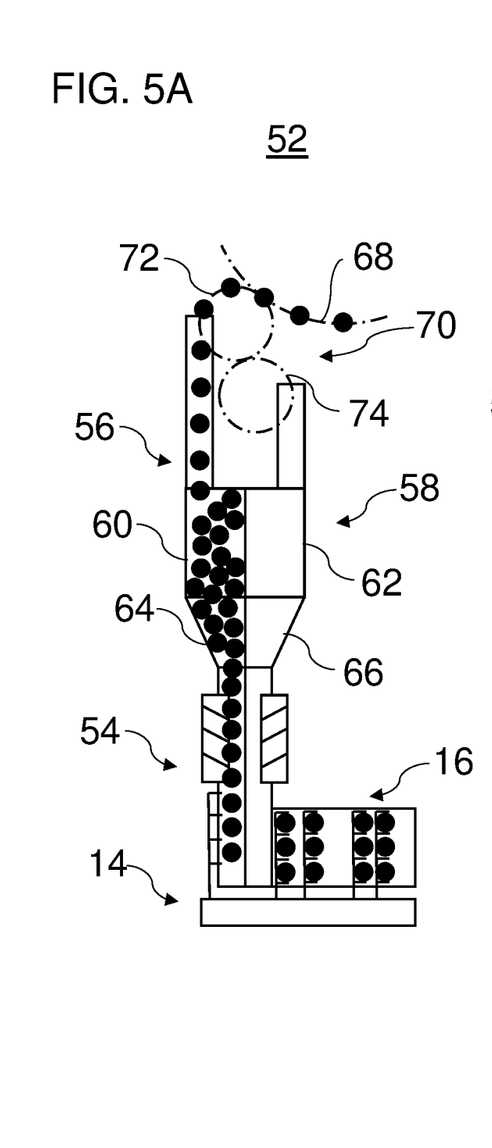
FIGS. 5A-5C show top views of one exemplary device for distributing and/or grouping containers in accordance with a further exemplary embodiment of the present disclosure.
Figure 5B:
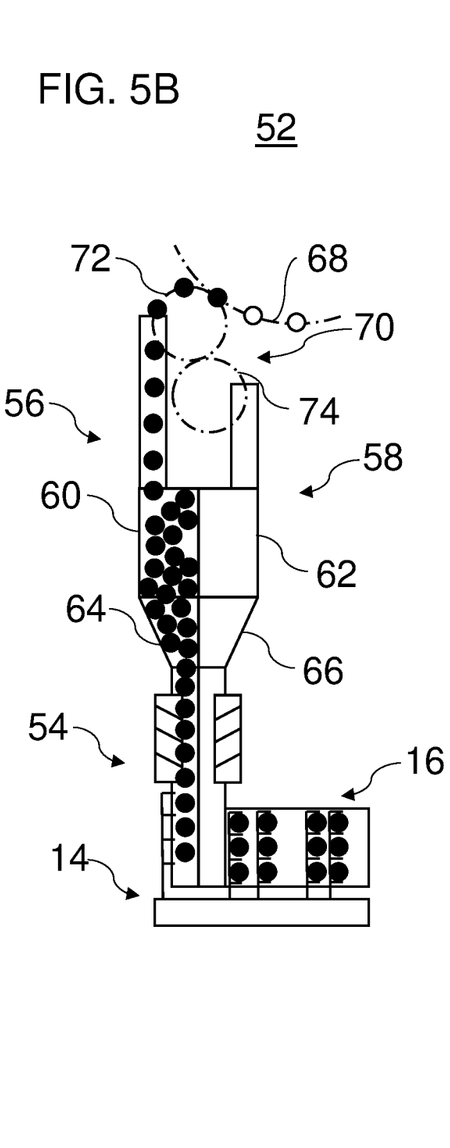
Figure 5C:
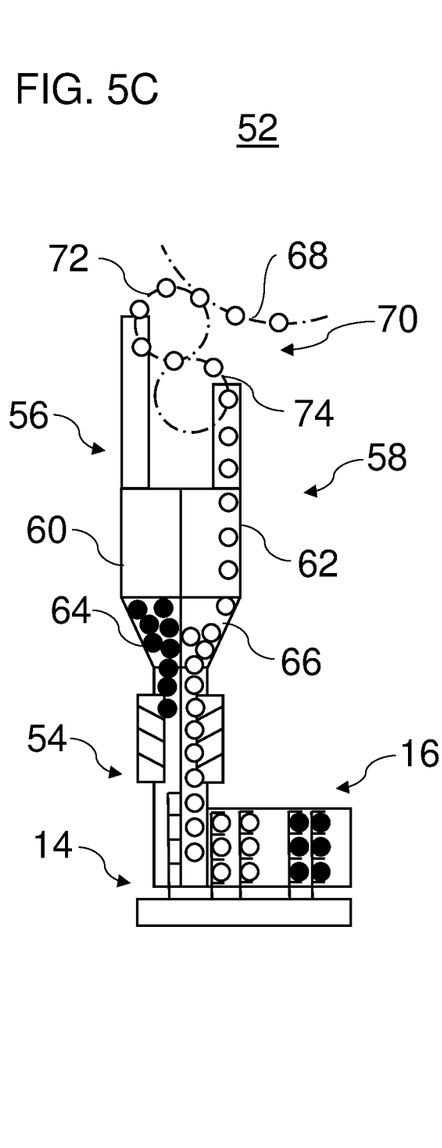

FIGS. 5A to 5C show a possible extension of the embodiment of FIG. 4 in different operating phases.

The device 52 has a first entry conveyor 56 and a second entry conveyor 58.

The entry conveyors 56, 58 are arranged upstream (in terms of the container stream) of the entry conveying apparatus 54. The first entry conveyor 56 can convey containers to a first track of the entry conveying apparatus 54. The second entry conveyor 58 can convey containers to a second track of the entry conveying apparatus 54. The entry conveyors 56, 58 are preferably arranged parallel to one another. The entry conveyors 56, 58 can have, for example, circulating conveyor belts for transporting containers.

The entry conveyors 56, 58 in each case have a container buffer store 60, 62 and a tapering section 64, 66.

Containers can be buffer stored in the container buffer store 60, 62, preferably in an unsorted manner.

The section 64 connects the container buffer store 60 to the first track of the entry conveying apparatus 54. The section 66 connects the container buffer store 62 to the second track of the entry conveying apparatus 54. In the sections 64, 66, a flow cross section for the containers tapers in each case from a multiple-track, preferably unsorted inlet to a single-track outlet. The inlet of the section 64 is connected to the container buffer store 60. The inlet of the section 66 is connected to the container buffer store 62. The outlet of the section 64 is connected to the first track of the entry conveying apparatus 54. The outlet of the section 66 is connected to the second track of the entry conveying apparatus 54.

The entry conveyors 56, 58 can receive containers from the same container treatment device 68, preferably via a preferably two-channel exit 70. The container treatment device 68 can be configured, for example, to produce, to clean, to check, to fill, to close, to label and/or to print containers. The exit 70 can have, for example, two exit stars (for example, rotating bar stars). A first exit star 72 connects the container treatment device 68 selectively to the first entry conveyor 56 or a second exit star 74. Depending on the setting, the first exit star 72 can convey containers from the container treatment device 68 to the first entry conveyor 56 or to the second exit star 74. The second exit star 74 connects the first exit star 72 to the second entry conveyor 58.

The extension with the exit 70 and the two entry conveyors 56, 58 allows a product change on the fly, as described in the following text.

FIG. 5A shows that first containers (circles filled with black) are fed from the container treatment device 68 via the two-channel exit 70 and the first entry conveyor 56 to the first track of the entry conveying apparatus 54 for distributing and/or grouping by the transfer conveying apparatus 14. During this, the second exit star 74, the second entry conveyor 58 and/or the second track of the entry conveying apparatus 54 could already be changed over for second containers. The second exit star 74, the second entry conveyor 58 and/or the second track of the entry conveying apparatus 54 are/is preferably not in operation.

FIG. 5B shows a changeover of the container treatment device 58 which before long is outputting second containers (circles filled with white). The second containers can differ from the first containers, for example, in terms of shape, size, filling or configuration (for example, labeling or printing). It is possible that the projections or extensions of the conveying element 34 which is preferably configured as a dividing bar are of adjustable configuration. In this way, a spacing between the projections can be adjusted if, for example in the case of a format change, the external dimensions of the second container differ considerably from the first container in geometric terms.

FIG. 5C shows that the second containers are now fed from the container treatment device 68 via the first exit star 72, the second exit star 74 and the second entry conveyor 58 to the second track of the entry conveying apparatus 54 for distributing and/or grouping by the transfer conveying device 14. During this, the first entry conveyor 56 and/or the first track of the entry conveying apparatus 54 might already be changed over for containers which are once again different. The first entry conveyor 56 and/or the first track of the entry conveying apparatus 54 are/is preferably not in operation.

Figure 6:
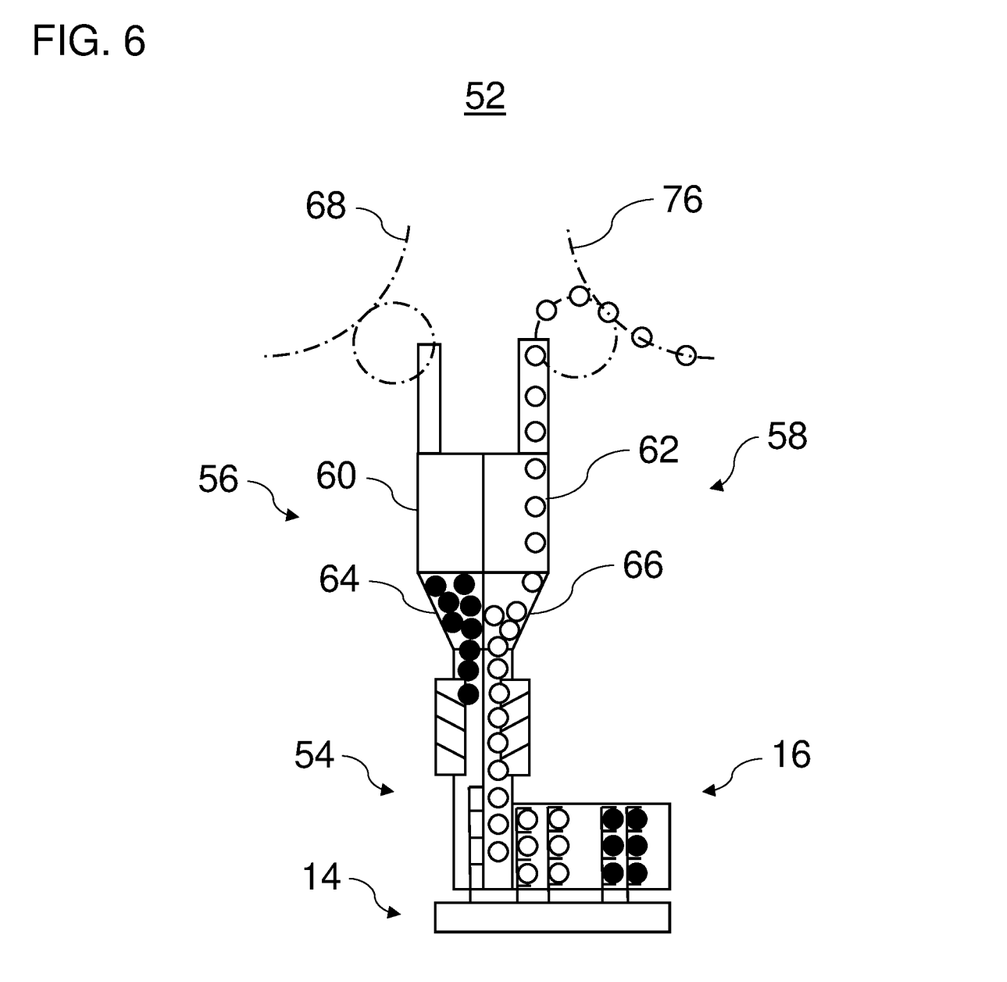
FIG. 6 shows a top view of one exemplary device for distributing and/or grouping containers in accordance with a further different exemplary embodiment of the present disclosure.

FIG. 6 shows that, as an alternative to the arrangement of FIGS. 5A to 5C, there is also the possibility, for example, for a second container treatment device 76 to be incorporated. In this way, a product change on the fly can likewise take place. Containers are either conveyed from the first container treatment device 68 to the transfer conveying apparatus 14. As an alternative, containers are conveyed from the second container treatment device 68 to the transfer conveying device 14.

The first container treatment device 68 is arranged upstream of the first entry conveyor 56. An exit star connects the first container treatment device 68 to the first entry conveyor 56. The second container treatment device 76 is arranged upstream of the second entry conveyor 58. An exit star connects the second container treatment device 76 to the second entry conveyor 58.

The second container treatment device 76 can be configured, for example, to produce, to clean, to check, to fill, to close, to label and/or to print containers.

The invention is not restricted to the above-described preferred exemplary embodiments. Rather, a multiplicity of variants and modifications are possible which likewise utilize the concept of the invention and therefore fall within the scope of protection. In particular, the invention also claims protection for the subject matter and the features of the subclaims independently of the claims which are referred to. In particular, the individual features of independent claim 1 are in each case disclosed independently of one another. In addition, the features of the subclaims are also disclosed independently of all the features of independent claim 1 and, for example, independently of the features with regard to the presence and/or the configuration of the entry conveying apparatus, the exit conveying apparatus and/or the transfer conveying apparatus of independent claim 1.

LIST OF DESIGNATIONS

10 Device for distributing and/or grouping
12 Entry conveying apparatus
14 Transfer conveying apparatus
16 Exit conveying apparatus
18 Container entry stream
20 Conveyor belt
22 Dividing device
24 Container exit stream
26 Conveyor belt
28 Guide track
30 Movement device
32 Long stator linear motor
34 Conveying element
36 Slotted guide
38 Grouping device
40 Push bar
42 Control unit
44 Drive unit
46 Container entry stream
48 Conveyor belt
50 Dividing device
52 Device for distributing and/or grouping
54 Entry conveying apparatus
56 First entry conveyor
58 Second entry conveyor
60,62 Container buffer store
64,66 Tapering section
68 (First) container treatment device
70 Exit
72 First exit star
74 Second exit star
76 Second container treatment device

The invention claimed is:

1. A device (10, 52) for distributing and/or grouping containers in a container treatment system, having:
    an entry conveying apparatus (12, 54) which is configured to convey a multiplicity of containers in a single-track container entry stream (18, 46);
    an exit conveying apparatus (16) which is configured to discharge the containers in a multiple-track container exit stream (24); and
    a transfer conveying apparatus (14) which has a guide track (28), which circulates parallel to or is oriented parallel to the multiple-track container exit stream (24), and a plurality of movement devices (30) which can be driven individually, preferably by a long stator linear motor (32), and are guided along the guide track (28), the plurality of movement devices (30) having a conveying element (34) which is configured to transfer in each case a plurality of containers from the entry conveying apparatus (12, 54) to the exit conveying apparatus (16).

2. The device (10, 52) as claimed in claim 1:
    the conveying elements (34) being configured in each case to push a plurality of containers on the rear side and/or to support them on the front side during the transfer; and/or
    it being possible for the conveying elements (34) to be retracted and extended parallel to the container entry stream (18, 46) for container retardation in an entry conveying direction of the entry conveying apparatus (12, 54), preferably at least partially by a slotted guide (36) and/or by a drive unit (44); and/or the conveying elements (34) being configured as divider bars, preferably with a plurality of projections which are arranged at a predefined or adjustable spacing from one another.

3. The device (10, 52) as claimed in claim 1, having, furthermore:

a control unit (42) which is set up for the operation of the entry conveying apparatus (12, 54), the transfer conveying apparatus (14), the exit conveying apparatus (16), the plurality of movement devices (30) and/or the long stator linear motor (32).

4. The device (10, 52) as claimed in claim 3, the control unit (42) being set up to move the plurality of movement devices (30) along the guide track (28) in such a way that:

the plurality of movement devices (30) are retarded directly before the contacting of the plurality of containers by the conveying element (34), preferably in order to reduce a jolt in the case of the contacting of the plurality of containers and/or for the at least approximately jolt-free contacting of the plurality of containers; and/or the plurality of movement devices (30) are accelerated in the case of the transfer of the plurality of containers, preferably to a conveying speed of the exit conveying apparatus (16).

5. The device (10, 52) as claimed in claim 3, the control unit (42) being set up to move the plurality of movement devices (30) along the guide track (28) in such a way that:

the conveying elements (34) of two movement devices, which preferably follow one another, of the plurality of movement devices (30) push the plurality of containers on the rear side and support them on the front side during the transfer; and/or the conveying elements (34) of two movement devices, which preferably follow one another, of the plurality of movement devices (30) clamp the plurality of containers between them during the transfer.

6. The device (10, 52) as claimed in claim 3, the control unit (42) being set up to move the plurality of movement devices (30) along the guide track (28) in such a way that:

a leading movement device of the plurality of movement devices (30) is moved back along the guide track (28), after the transfer of the plurality of containers by pushing on the rear side by way of the conveying element (34) of the leading movement device, until the conveying element (34) of the leading movement device makes contact on the front side with a plurality of following containers; and, during the transfer of the plurality of following containers, the conveying element (34) of the leading movement device supports the plurality of following containers on the front side, and the conveying element (34) of a trailing movement device of the plurality of movement devices (30) pushes the plurality of following containers on the rear side.

7. The device (10, 52) as claimed in claim 3, the control unit (42) being set up to move the plurality of movement devices (30) along the guide track (28) in such a way that:

at least two movement devices, which follow one another, of the plurality of movement devices (30) are moved along the guide track (28) relative to one another in such a way that the conveying elements (34) of the at least two movement devices group a plurality of container rows in the multiple-track container exit stream (24); and/or a spacing and/or a speed of the plurality of movement devices (30) are/is increased in a return section of the guide track (28), in which return section the plurality of movement devices (30) are returned for the renewed transfer of a plurality of containers.

8. The device (10, 52) as claimed in claim 1:

the device (10, 52) having, furthermore, a grouping device (38) which is arranged downstream of the transfer conveying apparatus (14) and has a plurality of push bars (40), preferably driven by chain, belt or linear motor, for grouping the plurality of containers on the exit conveying apparatus (16); and/or the entry conveying apparatus (12, 54) having at least one dividing device (22, 50) for specifying a preset spacing of the containers of the container entry stream (18, 46), the at least one dividing device (22, 50) preferably being configured as a dividing worm or having a plurality of dividing elements which can be driven individually by a long stator linear motor system.

9. The device (10, 52) as claimed in claim 1:

the entry conveying apparatus (12) being of single-track configuration; or the entry conveying apparatus (54) being of multiple-track configuration, it preferably being possible for the single-track container entry stream (18, 46) to be switched via the multiple-track entry conveying apparatus (54).

10. The device (52) as claimed in claim 1, having, furthermore:

a first entry conveyor (56), preferably with a container buffer store (60) and/or a section (64) with a stream cross section which tapers in a container stream direction, the first entry conveyor (56) being arranged upstream of the entry conveying apparatus (54) and being connected to a first track of the entry conveying apparatus (54); and a second entry conveyor (58), preferably with a container buffer store (62) and/or a section (66) with a stream cross section which tapers in a container stream direction, the second entry conveyor (58) being arranged upstream of the entry conveying apparatus (54) and being connected to a second track of the entry conveying apparatus (54).

11. The device (52) as claimed in claim 10, having, furthermore:

a container treatment device (68) which is arranged upstream of the first entry conveyor (56) and upstream of the second entry conveyor (58), and has an exit (70) for the selective output of containers to the first entry conveyor (56) or to the second entry conveyor (58); or a first container treatment device (68) which is arranged upstream of the first entry conveyor (56) and has an exit for the output of containers to the first entry conveyor (56), and a second container treatment device (76) which is arranged upstream of the second entry conveyor (58) and has an exit for the output of containers to the second entry conveyor (58).

12. A method for distributing and/or grouping containers in a container treatment system, preferably for operating a device (10, 52) as claimed in claim 1, comprising:

transferring in each case of a plurality of containers of a single-track container entry stream (18, 46) to a multiple-track container exit stream (24) by a transfer conveying apparatus (14) which has a guide track (28), which circulates parallel to or is oriented parallel to the multiple-track container exit stream (24), and a plurality of movement devices (30) which can be driven individually, preferably by a long stator linear motor (32) and are guided along the guide track (28), the plurality of movement devices (30) having a conveying element (34) which is configured to transfer in each case a plurality of containers from the single-track container entry stream (18, 46) to the multiple-track container exit stream (24).

13. The method as claimed in claim 12, the transferring comprising:
retarding of the respective movement device during the movement along the guide track (28) directly before contacting of the respective plurality of containers by the conveying element (34), preferably in order to decrease a jolt during the contacting of the respective plurality of containers and/or for the at least approximately jolt-free contacting of the respective plurality of containers; and/or
accelerating of the respective movement device during the movement along the guide track (28) during the transfer of the respective plurality of containers, preferably to a conveying speed of the container exit stream (24).

14. The method as claimed in claim 12, the transferring comprising:
rear-side pushing and front-side supporting of the plurality of containers during the transfer by way of the conveying elements (34) of two movement devices, which preferably follow one another, of the plurality of movement devices (30) which move along the guide track (28); and/or
clamping of the plurality of containers during the transfer by way of the conveying elements (34) of two movement devices, which preferably follow one another, of the plurality of movement devices (30) which move along the guide track (28).

15. The method as claimed in claim 12, the transferring comprising:
after the conveying element (34) of a leading movement device of the plurality of movement devices (30) has transferred the plurality of containers by way of rear-side pushing, moving back of the leading movement device along the guide track (28) until the conveying element (34) of the leading movement device contacts a plurality of following containers on the front side; and
front-side supporting of the plurality of following containers by way of the conveying element (34) of the leading movement device during the movement along the guide track (28), while the conveying element (34) of a trailing movement device of the plurality of movement devices (30) pushes the plurality of following containers on the rear side during the movement along the guide track (28).

16. The method as claimed in claim 12, the transferring comprising:
extending of the conveying element (34) of the respective movement device counter to the container entry stream (18, 46) before contacting of the respective plurality of containers, preferably by a slotted guide (36) and/or a drive unit; and
container retarding in an entry conveying direction by means of retracting and braking of the conveying element (34) of the respective movement device in a manner which is opposed with respect to the extending in the case of rear-side pushing of the respective plurality of containers during the moving of the respective movement device along the guide track (28), preferably by a slotted guide (36) and/or a drive unit (44).

17. The method as claimed in claim 12, comprising, furthermore:
grouping of a plurality of containers in the multiple-track container exit stream (24) by way of the conveying elements (34) of at least two movement devices, which preferably follow one another, by way of movement of the at least two movement devices relative to one another along the guide track (28); and/or
enlarging of a spacing and/or increasing a speed of the respective movement devices in a return section of the guide track (28) for the return of the plurality of movement devices (30) for the renewed transfer of in each case a plurality of containers; and/or
shifting of a track of the single-track container entry stream (18, 46) on a multiple-track entry conveying apparatus (54); and/or
changing of a spacing of the single-track container entry stream (18, 46) by individually drivable dividing elements of a dividing device; and/or
changing of a spacing between projections of the conveying elements (34) in the case of a format change.

18. The method as claimed in claim 12, comprising, furthermore:
interruption-free shifting of a container feed to the transfer conveying apparatus (14) from a first entry conveyor (56) to a second entry conveyor (58), preferably in order to change the container sort; and optionally:
changing over of the first entry conveyor (56) to a new container sort, while the second entry conveyor (58) feeds containers to the transfer conveying apparatus (14), and/or changing over of the second entry conveyor (58) to a new container sort, while the first entry conveyor (56) feeds containers to the transfer conveying apparatus (14).

* * * * *